US009967009B2

(12) United States Patent
Lin et al.

(10) Patent No.: US 9,967,009 B2
(45) Date of Patent: May 8, 2018

(54) DATA TRANSMISSION METHOD AND APPARATUS

(71) Applicant: Huawei Technologies Co., Ltd., Shenzhen (CN)

(72) Inventors: Yingpei Lin, Shanghai (CN); Jiayin Zhang, Shanghai (CN); Yi Luo, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 82 days.

(21) Appl. No.: 14/975,555

(22) Filed: Dec. 18, 2015

(65) Prior Publication Data
US 2016/0105227 A1  Apr. 14, 2016

Related U.S. Application Data

(63) Continuation of application No. PCT/CN2013/079909, filed on Jul. 23, 2013.

(51) Int. Cl.
*H04W 4/00* (2009.01)
*H04B 7/0456* (2017.01)
(Continued)

(52) U.S. Cl.
CPC ............ *H04B 7/0456* (2013.01); *H04W 4/06* (2013.01); *H04W 72/0413* (2013.01); *H04W 72/0453* (2013.01)

(58) Field of Classification Search
None
See application file for complete search history.

(56) References Cited

U.S. PATENT DOCUMENTS 6,470,195 B1    10/2002 Meyer
2006/0164969 A1  7/2006 Malik et al.
(Continued)

FOREIGN PATENT DOCUMENTS

CN    1826762 A    8/2006
CN    101868988 A   10/2010
(Continued)

OTHER PUBLICATIONS

"Part 11: Wireless LAN Medium Access Control (MAC) and Physical Layer (PHY) Specifications," IEEE Std 802.11-2012, IEEE Standard for Information technology—Telecommunications and information exchange between systems, Local and metropolitan area networks—Specific requirements, Mar. 29, 2012, 2793 pages.
(Continued)

*Primary Examiner* — Anh-Vu Ly
(74) *Attorney, Agent, or Firm* — Slater Matsil, LLP

(57) ABSTRACT

The present invention discloses a data transmission method and apparatus. A first access point determines a current working uplink receiving beam, and broadcasts an identifier of the current working uplink receiving beam of the first access point, so that when a first station associated with the first access point determines, according to the identifier of the current working uplink receiving beam of the first access point, that a first transmitting beam at which the first station is currently working is the current working uplink receiving beam of the first access point, the first station performs data transmission with the first access point by using the first transmitting beam. The current working uplink receiving beam of the first access point and a current working uplink receiving beam of a second access point do not overlap in space.

8 Claims, 6 Drawing Sheets

(51) Int. Cl.
*H04W 72/04* (2009.01)
*H04W 4/06* (2009.01)

(56) References Cited

U.S. PATENT DOCUMENTS

| | | |
|---|---|---|
| 2007/0149211 A1 | 6/2007 | Dunn et al. |
| 2009/0059889 A1 | 3/2009 | Baek et al. |
| 2010/0173639 A1 | 7/2010 | Li et al. |
| 2010/0202391 A1 | 8/2010 | Palanki et al. |
| 2011/0038308 A1* | 2/2011 | Song ............... H04B 7/0408 370/328 |
| 2011/0065448 A1* | 3/2011 | Song ............... H04B 7/0632 455/452.2 |
| 2011/0149842 A1* | 6/2011 | Cordeiro ........... H04B 7/0491 370/328 |
| 2012/0026987 A1* | 2/2012 | Jain ............... H04W 74/0866 370/336 |
| 2012/0051287 A1 | 3/2012 | Merlin et al. |
| 2012/0087265 A1* | 4/2012 | Tamaki ............. H01Q 1/246 370/252 |
| 2012/0329498 A1* | 12/2012 | Koo ............... H04J 11/005 455/501 |
| 2013/0040684 A1 | 2/2013 | Yu et al. |
| 2013/0155847 A1* | 6/2013 | Li ............... H04W 24/04 370/225 |
| 2013/0194950 A1* | 8/2013 | Haghighat ......... H04W 24/02 370/252 |
| 2014/0112355 A1 | 4/2014 | Fang et al. |
| 2015/0009966 A1* | 1/2015 | Lee ............... H04L 5/0035 370/336 |
| 2015/0189568 A1* | 7/2015 | Stanze ............. H04B 7/0417 370/331 |
| 2015/0230263 A1* | 8/2015 | Roy ............... H04W 36/0083 455/452.2 |
| 2015/0288427 A1* | 10/2015 | Wang ............. H04W 72/1273 370/329 |
| 2015/0295629 A1* | 10/2015 | Xia ............... H04B 7/0491 370/329 |
| 2016/0165630 A1* | 6/2016 | Oteri ............. H04W 74/04 370/336 |

FOREIGN PATENT DOCUMENTS

| | | |
|---|---|---|
| CN | 102308652 A | 1/2012 |
| CN | 102711113 A | 10/2012 |
| CN | 102833824 A | 12/2012 |
| CN | 103209044 A | 7/2013 |
| CN | 104219017 A | 12/2014 |
| WO | 2015081567 A1 | 6/2015 |

OTHER PUBLICATIONS

"Fast Beam Selection," Agenda Item: 6.2, Beamforming Enhancements, Source: Alcatel, Docment for: Discussion, 3GPP TSG RAN WG1 #33, XP-002292509, R1-03-0739, New York, USA, Aug. 25-29, 2003, 6 pages.

\* cited by examiner

A first access point and a second access point determine respectively current working uplink receiving beams corresponding respectively to the first access point and the second access point ⟶ 101

The first access point and the second access point broadcast respectively identifiers of the current working uplink receiving beams corresponding respectively to the first access point and the second access point, so that when a first station and a second station determine respectively that identifiers of a first transmitting beam and a second transmitting beam to which the first station and the second station belong respectively are consistent with the identifiers, which are broadcast respectively by the first access point and the second access point, of the current working transmitting beams corresponding respectively to the first access point and the second access point, the first station and the second station perform respectively, in the first transmitting beam and the second transmitting beam to which the first station and the second station belong respectively, data transmission with the first access point and the second access point that are associated respectively with the first station and the second station ⟶ 102

FIG. 1

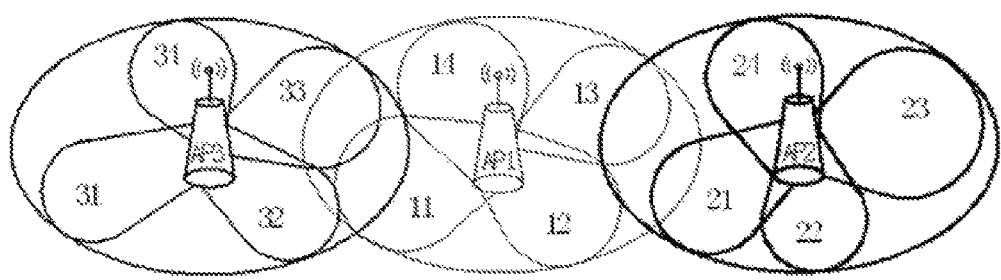

FIG. 2

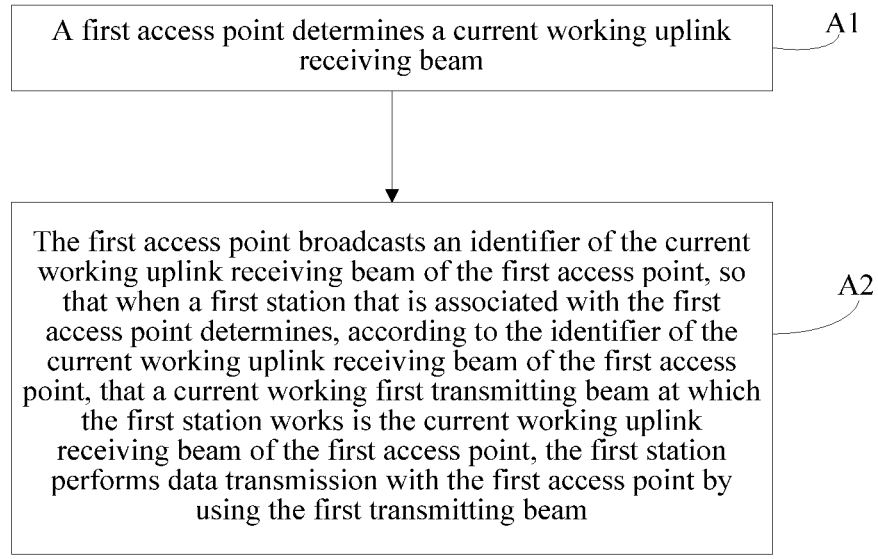
FIG. 1-A
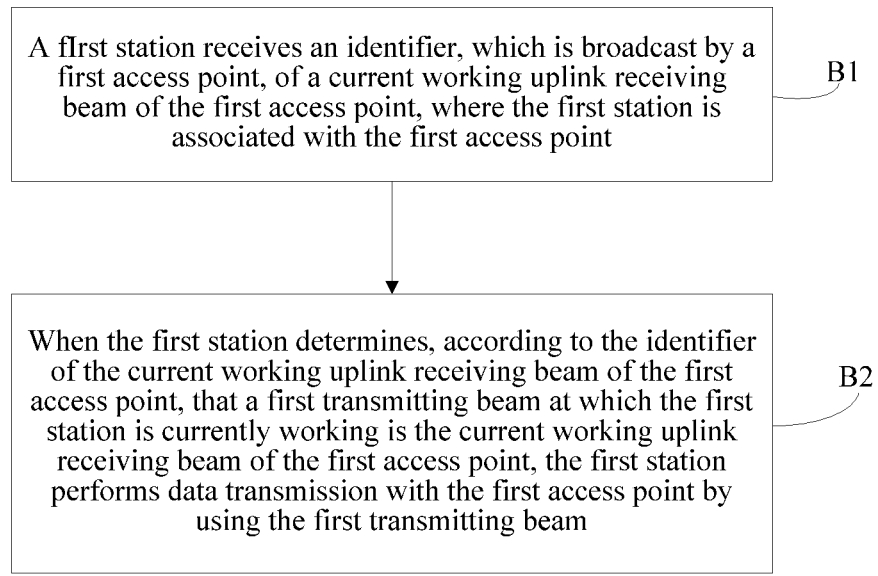
FIG. 1-B

DATA TRANSMISSION METHOD AND APPARATUS

This application is a continuation of International Patent Application No. PCT/CN2013/079909, filed on Jul. 23, 2013, which is hereby incorporated by reference in its entirety.

TECHNICAL FIELD

Embodiments of the present invention relate to the field of communications technologies, and in particular, to a data transmission method and apparatus.

BACKGROUND

Due to rapid development of Internet technologies and high-throughput and low-cost features of a wireless local area network (WLAN), the WLAN technology based on the IEEE 802.11 standard is widely used. However, growing congestion of a WLAN frequency band is caused due to limited spectrum resources of the WLAN. Moreover, an unlicensed frequency band is used in the WLAN. Therefore, quality of service cannot be guaranteed in the aspect of spectrum use for the WLAN.

To improve spectral usage efficiency of the WLAN, in the prior art, multiple access points (Access Point, AP) may be used to perform downlink coordinated processing. For example, by means of a precoding technology, multiple APs may send, in a same time-frequency resource by using a beamforming matrix, data to stations (STA) corresponding respectively to the APs. However, in uplink coordinated processing, after multiple stations establish an uplink coordinated relationship, and after one station obtains a right to use a channel, stations that coordinate with the station cannot synchronously learn that the station has obtained the right to use a channel, and cannot obtain in time a beamforming matrix for coordinated transmission, so that uplink coordinated transmission cannot be performed. Therefore, the prior art cannot support multiple stations to send, in a same time-frequency resource by using a beamforming matrix, data to APs corresponding respectively to the stations, resulting in low spectral usage efficiency.

SUMMARY

The present invention provides a data transmission method and apparatus, to overcome a problem that spectral usage efficiency is relatively low during data transmission of stations.

According to a first aspect, a data transmission method is provided, including: determining, by a first access point, a current working uplink receiving beam (transmitting beam), where the current working uplink receiving beam of the first access point and a current working uplink receiving beam of a second access point do not overlap in space; a reception area of the first access point includes at least two reception subareas, and each reception subarea serves as one uplink receiving beam; and a signal coverage area of the first access point and a signal coverage area of the second access point have an overlapping part; and broadcasting, by the first access point, an identifier of the current working uplink receiving beam of the first access point, so that when a first station that is associated with the first access point determines, according to the identifier of the current working uplink receiving beam of the first access point, that a first transmitting beam at which the first station is currently working is the current working uplink receiving beam of the first access point, the first station performs data transmission with the first access point by using the first transmitting beam.

Based on the first aspect, in a first possible implementation manner, before the determining, by a first access point, a current working uplink receiving beam, the method includes: negotiating, by the first access point with the second access point, working times and working sequences of respective uplink receiving beams of the first access point and the second access point, so that the current working uplink receiving beams corresponding respectively to the first access point and the second access point do not overlap in space.

Based on the first aspect or the first possible implementation manner of the first aspect, in a second possible implementation manner, the determining, by a first access point, a current working uplink receiving beam includes: determining, by the first access point, the current working uplink receiving beam of the first access point according to the working times and working sequences of the uplink receiving beams of the first access point and a current system time.

Based on the first possible implementation manner of the first aspect, in a third possible implementation manner, after the negotiating, by the first access point with the second access point, working times and working sequences of respective uplink receiving beams of the first access point and the second access point, the method includes: determining, by the first access point, according to location information of the first station, the first transmitting beam at which the first station works; and sending, by the first access point, an identifier of the first transmitting beam to the first station.

Based on the first possible implementation manner of the first aspect, in a fourth possible implementation manner, after the negotiating, by the first access point with the second access point, working times and working sequences of respective uplink receiving beams of the first access point and the second access point, the method includes: receiving, by the first access point, a first sounding signal sent by the first station; determining, by the first access point, according to the first sounding signal, the first transmitting beam at which the first station works, and determining a first transmit beamforming matrix used by the first station; and sending, by the first access point, an identifier of the first transmitting beam and the first transmit beamforming matrix to the first station.

Based on the first aspect, or any one of the first to the fourth possible implementation manners of the first aspect, in a fifth possible implementation manner, the broadcasting, by the first access point, an identifier of the current working uplink receiving beam of the first access point includes: broadcasting, by the first access point, in the current working uplink receiving beam of the first access point, the identifier of the current working uplink receiving beam of the first access point; or broadcasting, in the uplink receiving beams of the first access point, the identifier of the current working uplink receiving beam of the first access point.

According to a second aspect, a data transmission method is provided, including: receiving, by a first station, an identifier, which is broadcast by a first access point, of a current working uplink receiving beam of the first access point, where the first station is associated with the first access point; and when the first station determines, according to the identifier of the current working uplink receiving beam of the first access point, that a first transmitting beam at which the first station is currently working is the current working uplink receiving beam of the first access point, performing, by the first station, data transmission with the first access point by using the first transmitting beam. The current working uplink receiving beam of the first access point and a current working uplink receiving beam of a second access point do not overlap in space; a reception area of the first access point includes at least two reception subareas, and each reception subarea serves as one uplink receiving beam; and a signal coverage area of the first access point and a signal coverage area of the second access point have an overlapping part.

Based on the second aspect, in a first possible implementation manner, before the receiving, by a first station, an identifier, which is broadcast by a first access point, of a current working uplink receiving beam of the first access point, the method includes: receiving, by the first station, an identifier, which is sent by the first access point, of the first transmitting beam at which the first station works, where the first transmitting beam at which the first station works is determined by the first access point according to location information of the first station; and the first transmitting beam is one transmitting beam among uplink receiving beams of the first access point.

Based on the first possible implementation manner of the second aspect, in a second possible implementation manner, the performing data transmission with the first access point by using the first transmitting beam includes: performing, by the first station, data transmission in the first transmitting beam with the first access point by using a first antenna.

Based on the second aspect, in a third possible implementation manner, before the receiving, by a first station, an identifier, which is broadcast by a first access point, of a current working uplink receiving beam of the first access point, the method includes: sending, by the first station, a first sounding signal to the first access point; and receiving, by the first station, an identifier of the first transmitting beam and a first transmit beamforming matrix that are sent by the first access point, where the first transmitting beam is the first transmitting beam at which the first station works, and the first transmit beamforming matrix is a first transmit beamforming matrix used by the first station, the first transmitting beam and the first transmit beamforming matrix being determined by the first access point according to the first sounding signal.

Based on the third possible implementation manner of the second aspect, in a fourth possible implementation manner, the performing data transmission with the first access point by using the first transmitting beam includes: performing, by the first station, data transmission in the first transmitting beam with the first access point by using the first transmit beamforming matrix.

According to a third aspect, a coordinated data transmission method is provided, including: determining respectively, by a first access point and a second access point, current working uplink receiving beams corresponding respectively to the first access point and the second access point, where the current working uplink receiving beams corresponding respectively to the first access point and the second access point do not overlap in space; and a signal coverage area of the first access point and a signal coverage area of the second access point have an overlapping part; and broadcasting respectively, by the first access point and the second access point, identifiers of the current working uplink receiving beams corresponding respectively to the first access point and the second access point, so that when a first station and a second station determine respectively that identifiers of a first transmitting beam at which the first station is currently working and a second transmitting beam at which the second station is currently working are consistent with the identifiers, which are broadcast respectively by the first access point and the second access point, of the current working uplink receiving beams corresponding respectively to the first access point and the second access point, the first station and the second station perform respectively, in the first transmitting beam and the second transmitting beam at which the first station and the second station work respectively, data transmission with the first access point and the second access point that are associated respectively with the first station and the second station, where the first transmitting beam and the second transmitting beam do not overlap in space at a same moment.

Based on the third aspect, in a first possible implementation manner, a reception area of the first access point including at least two reception subareas, a reception area of the second access point including at least two reception subareas, and each reception subarea being used as one uplink receiving beam; and before the determining respectively, by a first access point and a second access point, current working uplink receiving beams corresponding respectively to the first access point and the second access point, the method includes, negotiating, by the first access point with the second access point, working times and working sequences of respective uplink receiving beams of the first access point and the second access point, so that the current working uplink receiving beams corresponding respectively to the first access point and the second access point do not overlap in space.

Based on the first possible implementation manner of the third aspect, in a second possible implementation manner, after the negotiating, by the first access point with the second access point, working times and working sequences of respective uplink receiving beams of the first access point and the second access point, the method includes: determining respectively, by the first access point and the second access point, according to location information of the first station and the second station that are associated respectively with the first access point and the second access point, the first transmitting beam and the second transmitting beam at which the first station and the second station work respectively; and sending respectively, by the first access point and the second access point, an identifier of the first transmitting beam and an identifier of the second transmitting beam to the first station and the second station that are associated respectively with the first access point and the second access point. The first transmitting beam and the second transmitting beam do not overlap in space at a same moment, the first transmitting beam is one transmitting beam among multiple uplink receiving beams that are obtained through dividing by the first access point, and the second transmitting beam is one transmitting beam among multiple uplink receiving beams that are obtained through dividing by the second access point.

Based on the first possible implementation manner of the third aspect, in a third possible implementation manner, after the negotiating, by the first access point with the second access point, working times and working sequences of respective uplink receiving beams of the first access point and the second access point, the method includes: receiving respectively, by the first access point and the second access point, a first sounding signal and a second sounding signal that are sent by the first station and the second station that are associated respectively with the first access point and the second access point; determining respectively, by the first access point and the second access point, according to the first sounding signal and the second sounding signal, the first transmitting beam and the second transmitting beam at which the first station and the second station work respectively, and determining respectively a first transmit beamforming matrix and a second transmit beamforming matrix that are used respectively by the first station and the second station; and sending respectively, by the first access point and the second access point, an identifier of the first transmitting beam and an identifier of the second transmitting beam, and the first transmit beamforming matrix and the second transmit beamforming matrix, to the first station and the second station that are associated respectively with the first access point and the second access point. The first transmitting beam and the second transmitting beam do not overlap in space at a same moment, the first transmitting beam is one transmitting beam among multiple uplink receiving beams that are obtained through dividing by the first access point, and the second transmitting beam is one transmitting beam among multiple uplink receiving beams that are obtained through dividing by the second access point.

Based on the third aspect, or any one of the first to the third possible implementation manners of the third aspect, in a fourth possible implementation manner, the determining respectively, by a first access point and a second access point, current working uplink receiving beams corresponding respectively to the first access point and the second access point includes: determining respectively, by the first access point and the second access point, according to the working times and working sequences corresponding to the respective uplink receiving beams of the first access point and the second access point, and according to a current system time, the current working uplink receiving beams corresponding respectively to the first access point and the second access point.

Based on the third aspect, or any one of the first to the third possible implementation manners of the third aspect, in a fifth possible implementation manner, the broadcasting respectively, by the first access point and the second access point, identifiers of the current working uplink receiving beams corresponding respectively to the first access point and the second access point includes: broadcasting respectively, by the first access point and the second access point, in the current working uplink receiving beams corresponding respectively to the first access point and the second access point, the identifiers of the current working uplink receiving beams corresponding respectively to the first access point and the second access point; or broadcasting, in the respective uplink receiving beams of the first access point and the second access point, the identifiers of the current working uplink receiving beams corresponding respectively to the first access point and the second access point.

According to a fourth aspect, a coordinated data transmission method is provided, including: receiving respectively, by a first station and a second station, identifiers, which are broadcast respectively by a first access point and a second access point, of current working uplink receiving beams corresponding respectively to the first access point and the second access point, where the first station is associated with the first access point, and the second station is associated with the second access point; and determining respectively, by the first station and the second station, that identifiers of a first transmitting beam at which the first station is currently working and a second transmitting beam at which the second station is currently working are consistent with the identifiers, which are broadcast respectively by the first access point and the second access point, of the current working uplink receiving beams corresponding respectively to the first access point and the second access point, performing respectively, by the first station and the second station, in the first transmitting beam and the second transmitting beam at which the first station and the second station work respectively, data transmission with the first access point and the second access point that are associated respectively with the first station and the second station. The first transmitting beam and the second transmitting beam do not overlap in space at a same moment; and a signal coverage area of the first access point and a signal coverage area of the second access point have an overlapping part.

Based on the fourth aspect, in a first possible implementation manner, before the receiving respectively, by a first station and a second station, identifiers, which are broadcast respectively by a first access point and a second access point, of current working uplink receiving beams corresponding respectively to the first access point and the second access point, the method includes: receiving respectively, by the first station and the second station, identifiers, which are sent by the first access point and the second access point that are associated respectively with the first station and the second station, of the first transmitting beam and the second transmitting beam at which the first station and the second station work respectively, where the identifiers of the first transmitting beam and the second transmitting beam at which the first station and the second station work respectively are determined by the first access point and the second access point according to location information of the first station and the second station that are associated respectively with the first access point and the second access point; and the first transmitting beam is one transmitting beam among uplink receiving beams of the first access point, and the second transmitting beam is one transmitting beam among uplink receiving beams of the second access point.

Based on the first possible implementation manner of the fourth aspect, in a second possible implementation manner, the performing respectively, by the first station and the second station, in the first transmitting beam and the second transmitting beam at which the first station and the second station work respectively, data transmission with the first access point and the second access point that are associated respectively with the first station and the second station includes: performing respectively, by the first station and the second station, in the first transmitting beam and the second transmitting beam at which the first station and the second station work respectively, by using a first antenna and a second antenna that are used respectively by the first station and the second station, data transmission with the first access point and the second access point that are associated respectively with the first station and the second station, where the first antenna is an antenna used in the first transmitting beam by the first station, and the second antenna is an antenna used in the second transmitting beam by the second station, channel resources used by the first antenna and the second antenna are totally or partially the same in a time domain, and/or channel resources used by the first antenna and the second antenna are totally or partially the same in a frequency domain.

Based on the fourth aspect, in a third possible implementation manner, before the receiving respectively, by a first station and a second station, identifiers, which are broadcast respectively by a first access point and a second access point, of current working uplink receiving beams corresponding respectively to the first access point and the second access point, the method includes: sending respectively, by the first station and the second station, a first sounding signal and a second sounding signal to the first access point and the second access point that are associated respectively with the first station and the second station, so that the first access point and the second access point determine respectively, according to the first sounding signal and the second sounding signal, the first transmitting beam and the second transmitting beam at which the first station and the second station work respectively, determine respectively a first transmit beamforming matrix and a second transmit beamforming matrix that are used respectively by the first station and the second station, and send respectively an identifier of the first transmitting beam and an identifier of the second transmitting beam, and the first transmit beamforming matrix and the second transmit beamforming matrix to the first station and the second station that are associated respectively with the first access point and the second access point, where the first transmitting beam is one transmitting beam among uplink receiving beams of the first access point, and the second transmitting beam is one transmitting beam among uplink receiving beams of the second access point.

Based on the third possible implementation manner of the fourth aspect, in a fourth possible implementation manner, the performing respectively, by the first station and the second station, in the first transmitting beam and the second transmitting beam at which the first station and the second station work respectively, data transmission with the first access point and the second access point that are associated respectively with the first station and the second station includes: performing respectively, by the first station and the second station, in the first transmitting beam and the second transmitting beam at which the first station and the second station work respectively, by using the first transmit beamforming matrix and the second transmit beamforming matrix that are corresponding respectively to the first station and the second station, data transmission with the first access point and the second access point that are associated respectively with the first station and the second station. The first transmit beamforming matrix is a beamforming matrix used in the first transmitting beam by the first station, and the second transmit beamforming matrix is a beamforming matrix used in the second transmitting beam by the second station, channel resources used by the first transmit beamforming matrix and the second transmit beamforming matrix are totally or partially the same in a time domain, and/or channel resources used by the first transmit beamforming matrix and the second transmit beamforming matrix are totally or partially the same in a frequency domain.

According to a fifth aspect, a data transmission apparatus is provided, where the apparatus is a first access point, and includes: a determining module, configured to determine a current working uplink receiving beam of the first access point, where the current working uplink receiving beam of the first access point and a current working uplink receiving beam of a second access point do not overlap in space; a reception area of the first access point includes at least two reception subareas, and each reception subarea serves as one uplink receiving beam; and a signal coverage area of the first access point and a signal coverage area of the second access point have an overlapping part; and a sending module, configured to broadcast an identifier of the current working uplink receiving beam of the first access point, so that when a first station that is associated with the first access point determines, according to the identifier of the current working uplink receiving beam of the first access point, that a first transmitting beam at which the first station is currently working is the current working uplink receiving beam of the first access point, the first station performs data transmission with the first access point by using the first transmitting beam.

Based on the fifth aspect, in a first possible implementation manner, the apparatus further includes: a negotiation module, configured to negotiate, with the second access point, working times and working sequences of respective uplink receiving beams of the first access point and the second access point, so that the current working uplink receiving beams corresponding respectively to the first access point and the second access point do not overlap in space.

Based on the fifth aspect or the first possible implementation manner of the fifth aspect, in a second possible implementation manner, the determining module is specifically configured to determine the current working uplink receiving beam of the first access point according to the working times and working sequences, obtained through negotiating by the negotiation module, of the uplink receiving beams of the first access point and a current system time.

Based on the first possible implementation manner of the fifth aspect, in a third possible implementation manner, the determining module is further configured to determine, according to location information of the first station, the first transmitting beam at which the first station works; and the sending module is configured to send an identifier of the first transmitting beam determined by the determining module to the first station.

Based on the first possible implementation manner of the fifth aspect, in a fourth possible implementation manner, the apparatus further includes: a receiving module, configured to receive a first sounding signal sent by the first station, where the determining module is further configured to: according to the first sounding signal received by the receiving module, determine the first transmitting beam at which the first station works, and determine a first transmit beamforming matrix used by the first station; and the sending module is further configured to send an identifier of the first transmitting beam and the first transmit beamforming matrix to the first station.

Based on the fifth aspect, or any one of the first to the fourth possible implementation manners of the fifth aspect, in a fifth possible implementation manner, the sending module is specifically configured to: broadcast, in the current working uplink receiving beam of the first access point, the identifier of the current working uplink receiving beam of the first access point; or broadcast, in the uplink receiving beams of the first access point, the identifier of the current working uplink receiving beam of the first access point.

According to a sixth aspect, a data transmission apparatus is provided, where the apparatus is first station, and includes: a receiving module, configured to receive an identifier, which is broadcast by a first access point, of a current working uplink receiving beam of the first access point, where the first station is associated with the first access point; a determining module, configured to determine, according to the identifier, which is received by the receiving module, of the current working uplink receiving beam of the first access point, that a first transmitting beam at which the first station is currently working is the current working uplink receiving beam of the first access point; a sending module, configured to perform data transmission with the first access point by using the first transmitting beam, where the current working uplink receiving beam of the first access point and a current working uplink receiving beam of a second access point do not overlap in space; a reception area of the first access point includes at least two reception subareas, and each reception subarea serves as one uplink receiving beam; and a signal coverage area of the first access point and a signal coverage area of the second access point have an overlapping part.

Based on the sixth aspect, in a first possible implementation manner, the receiving module is further configured to receive an identifier, which is sent by the first access point, of the first transmitting beam at which the first station works, where the first transmitting beam at which the first station works is determined by the first access point according to location information of the first station; and the first transmitting beam is one transmitting beam among uplink receiving beams of the first access point.

Based on the first possible implementation manner of the sixth aspect, in a second possible implementation manner, the sending module is specifically configured to: perform data transmission in the first transmitting beam with the first access point by using a first antenna.

Based on the sixth aspect, in a third possible implementation manner, the sending module is further configured to send a first sounding signal to the first access point; and the receiving module is further configured to receive an identifier of the first transmitting beam and a first transmit beamforming matrix that are sent by the first access point, where the first transmitting beam is the first transmitting beam at which the first station works, and the first transmit beamforming matrix is a first transmit beamforming matrix used by the first station, the first transmitting beam and the first transmit beamforming matrix being determined by the first access point according to the first sounding signal.

Based on the third possible implementation manner of the sixth aspect, in a fourth possible implementation manner, the sending module is specifically configured to: perform data transmission in the first transmitting beam with the first access point by using the first transmit beamforming matrix.

In the present invention, a first access point determines a current working uplink receiving beam, where current working uplink receiving beams corresponding respectively to the first access point and a second access point do not overlap in space; and then the first access point broadcasts an identifier of the current working uplink receiving beam of the first access point, so that when a first station associated with the first access point determines that an identifier of a first transmitting beam at which the first station works is consistent with an identifier of the current working uplink receiving beam of the first access point, the first station performs data transmission in the first transmitting beam with the first access point. Because the current working uplink receiving beams corresponding respectively to the first access point and the second access point do not overlap in space, interference during data transmission can be reduced and spectral usage efficiency can be improved.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and Persons of ordinary skill in the art may still derive other drawings from these accompanying drawings without creative efforts.

FIG. 1-A is a schematic flowchart of an uplink data transmission method according to an embodiment of the present invention;

FIG. 1-B is a schematic flowchart of an uplink data transmission method according to another embodiment of the present invention;

FIG. 1 is a schematic flowchart of an uplink coordinated data transmission method according to an embodiment of the present invention;

FIG. 2 is a schematic diagram of reception area division applied in an embodiment of the present invention;

DETAILED DESCRIPTION OF ILLUSTRATIVE EMBODIMENTS

Figure 3:
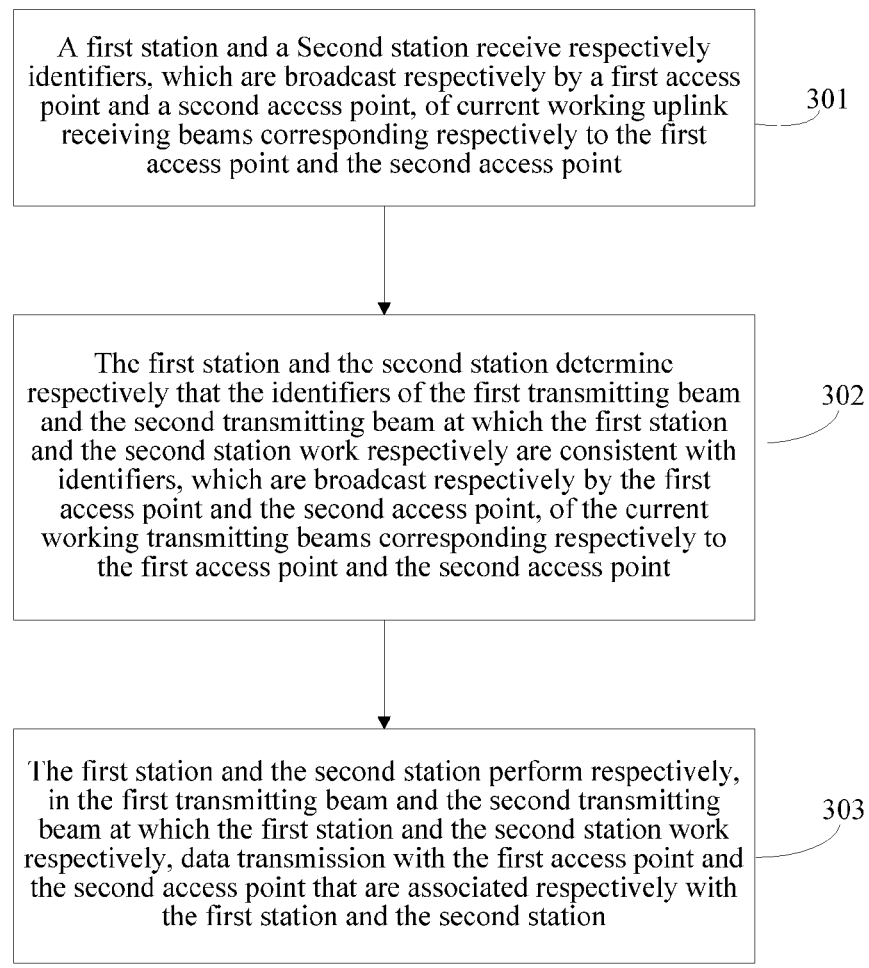
FIG. 3 is a schematic flowchart of an uplink coordinated data transmission method according to another embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

It should be noted that in the embodiments, an uplink coordinated data transmission method is described by using a first access point, a second access point, a first station and a second station as an example, and a person skilled in the art may understand that the embodiments of the present invention are not limited to the foregoing two access points APs and two stations STAs, and it may also be uplink coordinated transmission among multiple access points and multiple stations.

FIG. 1-A is a schematic flowchart of an uplink data transmission method according to an embodiment of the present invention. As shown in FIG. 1-A, the method includes the following steps.

A1: A first access point determines a current working uplink receiving beam.

It should be noted that the uplink transmission method of this embodiment is applied to a scenario in which a first access point and a second access point perform uplink coordinated transmission, that is, when a signal coverage area of the first access point and a signal coverage area of the second access point have an overlapping part, in order to reduce interference during data transmission while improving channel resource utilization, the first access point and the second access point negotiate working times and working sequences of respective uplink receiving beams of the first access point and the second access point, so that the current working uplink receiving beams corresponding respectively to the first access point and the second access point do not overlap in space.

A reception area of the first access point includes at least two reception subareas, and each reception subarea serves as one uplink receiving beam; and a reception area of the second access point includes at least two reception subareas, for example, a quantity of reception subareas of the first access point may be equal to a quantity of reception subareas of the second access point.

For example, specific implementation of step A1 includes: determining, by the first access point, the current working uplink receiving beam of the first access point according to the working times and working sequences of the uplink receiving beams of the first access point and a current system time.

For example, after the negotiating, by the first access point with the second access point, working times and working sequences of respective uplink receiving beams of the first access point and the second access point, the method includes: determining, by the first access point, according to location information of a first station, a first transmitting beam at which the first station works; and sending, by the first access point, an identifier of the first transmitting beam to the first station.

For example, after the negotiating, by the first access point with the second access point, working times and working sequences of respective uplink receiving beams of the first access point and the second access point, the method includes: receiving, by the first access point, a first sounding signal sent by the first station; determining, by the first access point, according to the first sounding signal, the first transmitting beam at which the first station works, and determining a first transmit beamforming matrix used by the first station; and sending, by the first access point, an identifier of the first transmitting beam and the first transmit beamforming matrix to the first station.

A2: The first access point broadcasts an identifier of the current working uplink receiving beam of the first access point, so that when the first station that is associated with the first access point determines, according to the identifier of the current working uplink receiving beam of the first access point, that a first transmitting beam at which the first station is currently working is the current working uplink receiving beam of the first access point, the first station performs data transmission with the first access point by using the first transmitting beam.

For example, specific implementation of step A2 includes: broadcasting, by the first access point, in the current working uplink receiving beam of the first access point, the identifier of the current working uplink receiving beam of the first access point; or broadcasting, in the uplink receiving beams of the first access point, the identifier of the current working uplink receiving beam of the first access point.

Correspondingly, after the first station receives the identifier, which is broadcast by the first access point, of the current working uplink receiving beam of the first access point, when the first station determines, according to the identifier of the current working uplink receiving beam of the first access point, that the first transmitting beam at which the first station is currently working is the current working uplink receiving beam of the first access point, by using the first transmitting beam, the first station performs data transmission with the first access point by using a first antenna or the first transmit beamforming matrix.

In the present invention, a first access point determines a current working uplink receiving beam, where current working uplink receiving beams corresponding respectively to the first access point and a second access point do not overlap in space; and then the first access point broadcasts an identifier of the current working uplink receiving beam of the first access point, so that when a first station that is associated with the first access point determines that an identifier of a first transmitting beam at which the first station works is consistent with an identifier of the current working uplink receiving beam of the first access point, the first station performs data transmission in the first transmitting beam with the first access point. Because the current working uplink receiving beams corresponding respectively to the first access point and the second access point do not overlap in space, a first transmitting beam at which the first station that is associated with the first access point is currently working and a second transmitting beam at which a second station that is associated with the second access point is currently working do not overlap in space, thereby reducing interference during uplink coordinated transmission of multiple stations.

FIG. 1-B is a schematic flowchart of an uplink data transmission method according to another embodiment of the present invention. As shown in FIG. 1-B, the method includes the following steps.

B1: A first station receives an identifier, which is broadcast by a first access point, of a current working uplink receiving beam of the first access point, where the first station is associated with the first access point.

It should be noted that the uplink transmission method of this embodiment is applied to a scenario in which a first access point and a second access point perform uplink coordinated transmission, that is, when a signal coverage area of the first access point and a signal coverage area of the second access point have an overlapping part, in order to reduce interference during data transmission while improving channel resource utilization, the first access point and the second access point negotiate working times and working sequences of respective uplink receiving beams of the first access point and the second access point, so that the current working uplink receiving beams corresponding respectively to the first access point and the second access point do not overlap in space.

A reception area of the first access point includes at least two reception subareas, and each reception subarea serves as one uplink receiving beam; and a reception area of the second access point includes at least two reception subareas, for example, a quantity of reception subareas of the first access point may be equal to a quantity of reception subareas of the second access point.

B2: When the first station determines, according to the identifier of the current working uplink receiving beam of the first access point, that a first transmitting beam at which the first station is currently working is the current working uplink receiving beam of the first access point, the first station performs data transmission with the first access point by using the first transmitting beam.

For example, before step B1, the method includes: receiving, by the first station, an identifier, which is sent by the first access point, of the first transmitting beam at which the first station works, where the first transmitting beam at which the first station works is determined by the first access point according to location information of the first station; and the first transmitting beam is one transmitting beam among uplink receiving beams of the first access point.

Correspondingly, specific implementation of step B2 is: performing, by the first station, data transmission in the first transmitting beam with the first access point by using a first antenna.

For example, before step B1, the method includes: sending, by the first station, a first sounding signal to the first access point, so that the first access point determines, according to the first sounding signal, the first transmitting beam at which the first station works, determines a first transmit beamforming matrix used by the first station, and sends the identifier of first transmitting beam and the first transmit beamforming matrix to the first station.

Correspondingly, specific implementation of step B2 is: performing, by the first station, data transmission in the first transmitting beam with the first access point by using the first transmit beamforming matrix.

In the present invention, a first access point determines a current working uplink receiving beam, where current working uplink receiving beams corresponding respectively to the first access point and a second access point do not overlap in space; and then the first access point broadcasts an identifier of the current working uplink receiving beam of the first access point, so that when a first station that is associated with the first access point determines that an identifier of a first transmitting beam at which the first station works is consistent with an identifier of the current working uplink receiving beam of the first access point, the first station performs data transmission in the first transmitting beam with the first access point. Because the current working uplink receiving beams corresponding respectively to the first access point and the second access point do not overlap in space, a first transmitting beam at which the first station that is associated with the first access point is currently working and a second transmitting beam at which a second station that is associated with the second access point is currently working do not overlap in space, thereby reducing interference during uplink coordinated transmission of multiple stations.

FIG. 1 is a schematic flowchart of an uplink coordinated data transmission method according to an embodiment of the present invention. As shown in FIG. 1, a process of the uplink coordinated data transmission method is described in this embodiment by using a first access point and first station that is associated with the first access point, and a second access point and a second station that is associated with the second access point as an example.

101: A first access point and a second access point determine respectively current working uplink receiving beams corresponding respectively to the first access point and the second access point.

In an optional implementation manner of the present invention, to improve channel resource utilization, the first access point and the second access point are coordinating access points. For example, the first access point and the second access point may receive, in a same time-domain and/or frequency-domain channel resource by using a receive beamforming matrix, data that is sent by stations associated respectively with the first access point and the second access point. Further, to reduce interference when the first access point and the second access point receive, in a same time-domain and/or frequency-domain channel resource by using a receive beamforming matrix, data that is sent by the stations associated respectively with the first access point and the second access point, before step 101, the method includes:

1011: The first access point and the second access point each divide a respective reception area into multiple reception subareas, where each reception subarea serves as one uplink receiving beam, and each determine identifiers of the multiple uplink receiving beams obtained through dividing by each of the first access point and the second access point.

FIG. 2 is a schematic diagram of reception area division applied in this embodiment of the present invention. As shown in FIG. 2, AP1 is the first access point, AP2 is the second access point, and an AP3 is a third access point, where AP1 divides a reception area of AP1 into four uplink receiving beams (transmitting beam), and allocates a corresponding identifier to each uplink receiving beam, that is, 11, 12, 13, and 14; AP2 divides a reception area of AP2 into four uplink receiving beams, and allocates a corresponding identifier to each uplink receiving beam, that is, 21, 22, 23, and 24; and AP3 divides a reception area of AP3 into four uplink receiving beams, and allocates a corresponding identifier to each uplink receiving beam, that is, 31, 32, 33, and 34. It should be noted that this embodiment is described by using AP1 and AP2 as an example.

1012: The first access point and the second access point negotiate working times and working sequences of the multiple uplink receiving beams obtained respectively through dividing by the first access point and the second access point, so that the current working uplink receiving beams corresponding respectively to the first access point and the second access point do not overlap in space. During specific implementation:

For example, as shown in FIG. 2, after the first access point and the second access point have each divided a respective uplink reception area into four uplink receiving beams, after establishing a coordination relationship with the second access point, the first access point may exchange, with the second access point, the uplink receiving beams obtained respectively through dividing by the first access point and the second access point, and identifiers thereof; if the first access point has determined working times and working sequences of uplink receiving beams, the first access point may send the working times and working sequences of the uplink receiving beams of the first access point to the second access point, so that the second access point determines, according to the working times and working sequences of the uplink receiving beams of the first access point, working times and working sequences of uplink receiving beams of the second access point, so as to avoid or reduce interference to the first access point.

Alternatively, if the first access point has not determined working times and working sequences of uplink receiving beams, assuming that the second access point has determined working times and working sequences of its uplink receiving beams, the first access point may send, to the second access point, a request message for acquiring transmitting beam information of the second access point, and the second access point may send the uplink receiving beams of the second access point, and identifiers, working times, and working sequences of the uplink receiving beams of the second access point to the first access point, so that the first access point determines, according to the working times and working sequences of the uplink receiving beams of the second access point, the working times and working sequences of the uplink receiving beams of the first access point, so as to avoid or reduce interference to the second access point.

For another example, as shown in FIG. 2, after the first access point has divided its uplink reception area into four uplink receiving beams, and has determined identifiers, working times, and working sequences of the uplink receiving beams, after establishing a coordination relationship with the second access point, the first access point may send transmitting beam information of the first access point (including the identifiers, working times, and working sequences of the uplink receiving beams that are obtained through dividing by the first access point) to the second access point, so that the second access point divides the uplink reception area of the second access point into four transmitting beams and determines identifiers, working times, and working sequences of the uplink receiving beams according to the transmitting beam information of the first access point, so as to avoid or reduce interference to the first access point.

Alternatively, after the second access point has divided its uplink reception area into four uplink receiving beams, and has determined identifiers, working times, and working sequences of the uplink receiving beams, after the first access point establishes a coordination relationship with the second access point, the first access point may send, to the second access point, a request message for acquiring transmitting beam information of the second access point (including the identifiers, working times, and working sequences of the uplink receiving beams that are obtained through dividing by the second access point), and the second access point sends the transmitting beam information of the second access point to the first access point, so that the first access point divides the uplink reception area of the first access point into four uplink receiving beams and determines identifiers, working times, and working sequences of the uplink receiving beams according to the transmitting beam information of the second access point, so as to avoid or reduce interference to the second access point.

It should be noted that, in addition to the foregoing embodiments, the first access point and the second access point may also be enabled to calculate automatically identifiers, times, and sequences of their respective uplink receiving beams according to a pre-arranged sequence or according to a specific algorithm.

Table 1 is a working sequence table of uplink receiving beams corresponding respectively to AP1, AP2, and AP3 shown in FIG. 2. As shown in Table 1, when AP1 works on uplink receiving beam 11, AP2 works on uplink receiving beam 22. At each switching of the working time, AP1 and AP2 switch transmitting beams simultaneously; assuming that when AP1 switches from uplink receiving beam 11 to uplink receiving beam 12, AP2 switches from uplink receiving beam 22 to uplink receiving beam 24, and after four times of transmitting beam switching, AP1 and AP2 enter a next rotation cycle.

TABLE 1

| AP1 | 11 | 12 | 13 | 14 | 11 | 12 | 13 | 14 |
| AP2 | 22 | 24 | 23 | 21 | 22 | 24 | 23 | 21 |
| AP3 | 31 | 32 | 33 | 34 | 21 | 32 | 33 | 34 |

Therefore, the first access point and the second access point may determine respectively, according to the identifiers and corresponding working times and working sequences, determined respectively by the first access point and the second access point, of the multiple uplink receiving beams, and according to a current system time, the current working uplink receiving beams corresponding respectively to the first access point and the second access point.

In an optional implementation manner of the present invention, after the first access point and the second access point each divide a respective uplink reception area into multiple uplink receiving beams, and each determine identifiers of the multiple uplink receiving beams obtained through dividing by each of the first access point and the second access point, the method includes: determining respectively, by the first access point and the second access point, according to location information of the first station and the second station that are associated respectively with the first access point and the second access point, the first transmitting beam and the second transmitting beam at which the first station and the second station work respectively, where when being associated with the first access point, the first station may send location information of the first station to the first access point, and when being associated with the second access point, the second station may send location information of the second station to the second access point; and sending respectively, by the first access point and the second access point, an identifier of the first transmitting beam and an identifier of the second transmitting beam to the first station and the second station that are associated respectively with the first access point and the second access point. The first transmitting beam and the second transmitting beam do not overlap in space at a same moment, the first transmitting beam is one transmitting beam among multiple uplink receiving beams that are obtained through dividing by the first access point, and the second transmitting beam is one transmitting beam among multiple uplink receiving beams that are obtained through dividing by the second access point.

In an optional implementation manner of the present invention, after the first access point and the second access point each divide a respective reception area into multiple reception subareas, and each determine identifiers of the multiple uplink receiving beams obtained through dividing by each of the first access point and the second access point, the method includes: receiving respectively, by the first access point and the second access point, a first sounding signal and a second sounding signal that are sent by the first station and the second station that are associated respectively with the first access point and the second access point, where the sounding signal may be, for example, a PLCP protocol data unit (PLCP Protocol Data Unit, PPDU) used for sounding (sounding); determining respectively, by the first access point and the second access point, according to the first sounding signal and the second sounding signal, the first transmitting beam at which the first station is currently working and the second transmitting beam at which the second station is currently working, and determining respectively a first transmit beamforming matrix and a second transmit beamforming matrix that are used respectively by the first station and the second station; and sending respectively, by the first access point and the second access point, an identifier of the first transmitting beam and an identifier of the second transmitting beam, and the first transmit beamforming matrix and the second transmit beamforming matrix, to the first station and the second station that are associated respectively with the first access point and the second access point, so that the first station and the second station perform respectively, in the first transmitting beam and the second transmitting beam at which the first station and the second station work respectively, by using the first transmit beamforming matrix and the second transmit beamforming matrix that are corresponding respectively to the first station and the second station, data transmission with the first access point and the second access point that are associated respectively with the first station and the second station. The first transmitting beam and the second transmitting beam do not overlap in space at a same moment, the first transmitting beam is one transmitting beam among multiple uplink receiving beams that are obtained through dividing by the first access point, and the second transmitting beam is one transmitting beam among multiple uplink receiving beams that are obtained through dividing by the second access point.

During specific implementation, for example, after being associated with AP1, the first station may send the first sounding signal to AP1 by using an existing sounding (sounding) mechanism, where the first sounding signal may be, for example, a PLCP protocol data unit (PLCP Protocol Data Unit, PPDU) used for sounding (sounding). AP1 determines, according to the received sounding PPDU, a transmitting beam at which the first station works, and calculates the first transmit beamforming matrix, which works in the transmitting beam, of the first station.

102: The first access point and the second access point broadcast respectively identifiers of the current working uplink receiving beams corresponding respectively to the first access point and the second access point, so that when the first station and the second station determine respectively that identifiers of the first transmitting beam and the second transmitting beam at which the first station and the second station work respectively are consistent with the identifiers, which are broadcast respectively by the first access point and the second access point, of the current working transmitting beams corresponding respectively to the first access point and the second access point, the first station and the second station perform respectively, in the first transmitting beam and the second transmitting beam at which the first station and the second station work respectively, data transmission with the first access point and the second access point that are associated respectively with the first station and the second station.

In an optional implementation manner of the present invention, the broadcasting respectively, by the first access point and the second access point, identifiers of the current working uplink receiving beams corresponding respectively to the first access point and the second access point includes: broadcasting respectively, by the first access point and the second access point, in the current working uplink receiving beams corresponding respectively to the first access point and the second access point, the identifiers of the current working uplink receiving beams corresponding respectively to the first access point and the second access point; or broadcasting, in the multiple uplink receiving beams obtained respectively through dividing by the first access point and the second access point, the identifiers of the current working uplink receiving beams corresponding respectively to the first access point and the second access point.

For example, after the first station and the second station receive respectively identifiers, which are broadcast respectively by the first access point and the second access point, of the current working uplink receiving beams corresponding respectively to the first access point and the second access point, and the first station and the second station determine respectively that identifiers of the first transmitting beam and the second transmitting beam at which the first station and the second station work respectively are consistent with the identifiers, which are broadcast respectively by the first access point and the second access point, of the current working transmitting beams corresponding respectively to the first access point and the second access point, the first station and the second station perform respectively, in the first transmitting beam and the second transmitting beam at which the first station and the second station work respectively, by using a first antenna and a second antenna that are used respectively by the first station and the second station or by using the first transmit beamforming matrix and the second transmit beamforming matrix that are corresponding respectively to the first station and the second station, data transmission with the first access point and the second access point that are associated respectively with the first station and the second station.

In this embodiment of the present invention, a first access point and a second access point determine respectively current working uplink receiving beams corresponding respectively to the first access point and the second access point, where the current working uplink receiving beams corresponding respectively to the first access point and the second access point do not overlap in space; and then the first access point and the second access point broadcast respectively identifiers of the current working uplink receiving beams corresponding respectively to the first access point and the second access point, so that when a first station and a second station determine respectively that identifiers of a first transmitting beam and a second transmitting beam at which the first station and the second station work respectively are consistent with the identifiers, which are broadcast respectively by the first access point and the second access point, of the current working transmitting beams corresponding respectively to the first access point and the second access point, the first station and the second station send respectively, in the first transmitting beam and the second transmitting beam at which the first station and the second station work respectively, by using a same channel resource, data to the first access point and the second access point that are associated respectively with the first station and the second station, which improves spectral usage efficiency. Moreover, the current working transmitting beams of the stations do not overlap in space, which can reduce interference during uplink coordinated transmission of multiple stations.

FIG. 3 is a schematic flowchart of an uplink coordinated data transmission method according to another embodiment of the present invention. As shown in FIG. 3, the method includes the following steps.

301: A first station and a second station receive respectively identifiers, which are broadcast respectively by a first access point and a second access point, of current working uplink receiving beams corresponding respectively to the first access point and the second access point.

The first station is associated with the first access point, and the second station is associated with the second access point.

In an optional implementation manner of the present invention, before the receiving respectively, by a first station and a second station, identifiers, which are broadcast respectively by a first access point and a second access point, of current working uplink receiving beams corresponding respectively to the first access point and the second access point, the method includes: receiving respectively, by the first station and the second station, identifiers, which are sent by the first access point and the second access point that are associated respectively with the first station and the second station, of a first transmitting beam and a second transmitting beam at which the first station and the second station work respectively, where the identifiers of the first transmitting beam and the second transmitting beam at which the first station and the second station work respectively are determined by the first access point and the second access point according to location information of the first station and the second station that are associated respectively with the first access point and the second access point; and the first transmitting beam is one transmitting beam among multiple uplink receiving beams that are obtained through dividing by the first access point, and the second transmitting beam is one transmitting beam among multiple uplink receiving beams that are obtained through dividing by the second access point.

In an optional implementation manner of the present invention, before the receiving respectively, by a first station and a second station, identifiers, which are broadcast respectively by a first access point and a second access point, of current working uplink receiving beams corresponding respectively to the first access point and the second access point, the method includes: sending respectively, by the first station and the second station, a first sounding signal and a second sounding signal to the first access point and the second access point that are associated respectively with the first station and the second station, so that the first access point and the second access point determine respectively, according to the first sounding signal and the second sounding signal, the first transmitting beam at which the first station is currently working and the second transmitting beam at which the second station is currently working, determine respectively a first transmit beamforming matrix and a second transmit beamforming matrix that are used respectively by the first station and the second station, and send respectively an identifier of the first transmitting beam and an identifier of the second transmitting beam, and the first transmit beamforming matrix and the second transmit beamforming matrix to the first station and the second station that are associated respectively with the first access point and the second access point. The first transmitting beam is one transmitting beam among multiple transmitting beams that are obtained through dividing by the first access point; the second transmitting beam is one transmitting beam among multiple transmitting beams that are obtained through dividing by the second access point; and the first transmitting beam and the second transmitting beam do not overlap in space at a same moment.

It should be noted that the first access point and the second access point need to each divide a respective uplink reception area into multiple transmitting beams, and each determine identifiers, working times, and working sequences of its respective uplink receiving beams, so that a current working uplink receiving beam of the first access point and a current working uplink receiving beam of the second access point do not conflict or overlap in space. For specific implementation, reference may be made to related descriptions in the embodiment shown in FIG. 1, and no further details are provided herein.

302: The first station and the second station determine respectively that the identifiers of the first transmitting beam and the second transmitting beam at which the first station and the second station work respectively are consistent with identifiers, which are broadcast respectively by the first access point and the second access point, of the current working transmitting beams corresponding respectively to the first access point and the second access point.

303: The first station and the second station perform respectively, in the first transmitting beam and the second transmitting beam at which the first station and the second station work respectively, data transmission with the first access point and the second access point that are associated respectively with the first station and the second station.

In an optional implementation manner of the present invention, during specific implementation of step 303.

For example, the first station and the second station perform respectively, in the first transmitting beam and the second transmitting beam at which the first station and the second station work respectively, by using a first antenna and a second antenna that are used respectively by the first station and the second station, data transmission with the first access point and the second access point that are associated respectively with the first station and the second station. The first antenna is an antenna used in the first transmitting beam by the first station, and the second antenna is an antenna used in the second transmitting beam by the second station, channel resources used by the first antenna and the second antenna are totally or partially the same in a time domain, and/or channel resources used by the first antenna and the second antenna are totally or partially the same in a frequency domain.

For another example, the first station and the second station perform respectively, in the first transmitting beam and the second transmitting beam at which the first station and the second station work respectively, by using the first transmit beamforming matrix and the second transmit beamforming matrix that are corresponding respectively to the first station and the second station, data transmission with the first access point and the second access point that are associated respectively with the first station and the second station. As shown in FIG. 2, when the first station sends data to AP1, the first station sends the data to AP1 by using the first transmit beamforming matrix, and AP1 receives, by using a receive beamforming matrix of a transmitting beam at which the first station works, the data sent by the first station.

The first transmit beamforming matrix is a beamforming matrix used in the first transmitting beam by the first station, and the second transmit beamforming matrix is a beamforming matrix used in the second transmitting beam by the second station, channel resources used by the first transmit beamforming matrix and the second transmit beamforming matrix are totally or partially the same in a time domain, and/or channel resources used by the first transmit beamforming matrix and the second transmit beamforming matrix are totally or partially the same in a frequency domain.

In this embodiment of the present invention, a first access point and a second access point determine respectively current working uplink receiving beams corresponding respectively to the first access point and the second access point, where the current working uplink receiving beams corresponding respectively to the first access point and the second access point do not overlap in space; and then the first access point and the second access point broadcast respectively identifiers of the current working uplink receiving beams corresponding respectively to the first access point and the second access point, so that when a first station and a second station determine respectively that identifiers of a first transmitting beam and a second transmitting beam at which the first station and the second station work respectively are consistent with the identifiers, which are broadcast respectively by the first access point and the second access point, of the current working uplink receiving beams corresponding respectively to the first access point and the second access point, the first station and the second station send respectively, in the first transmitting beam and the second transmitting beam at which the first station and the second station work respectively, by using a same channel resource, data to the first access point and the second access point that are associated respectively with the first station and the second station, which improves spectral usage efficiency. Moreover, the current working transmitting beams of the stations do not overlap in space, which can reduce interference during uplink coordinated transmission of multiple stations.

Figure 4:
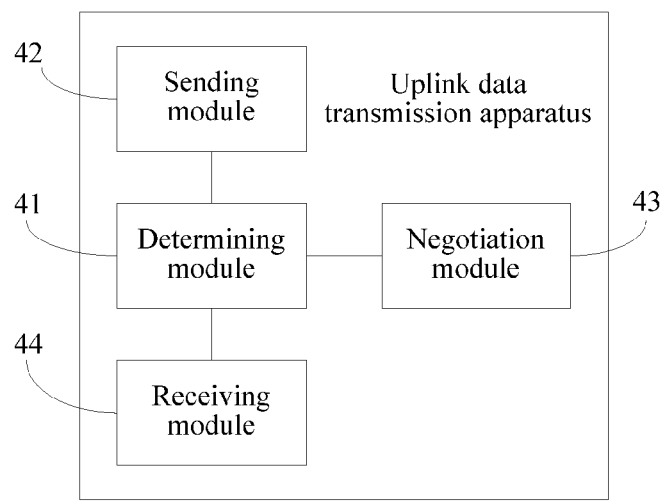
FIG. 4 is a schematic structural diagram of an uplink data transmission apparatus according to another embodiment of the present invention.

FIG. 4 is a schematic structural diagram of an uplink data transmission apparatus according to another embodiment of the present invention. As shown in FIG. 4, the apparatus is a first access point, and specifically includes: a determining module 41, configured to determine a current working uplink receiving beam of the first access point, where the current working uplink receiving beam of the first access point and a current working uplink receiving beam of a second access point do not overlap in space; a reception area of the first access point includes at least two reception subareas, and each reception subarea serves as one uplink receiving beam; and a signal coverage area of the first access point and a signal coverage area of the second access point have an overlapping part; and a sending module 42, configured to broadcast an identifier of the current working uplink receiving beam of the first access point, so that when a first station that is associated with the first access point determines, according to the identifier of the current working uplink receiving beam of the first access point, that a first transmitting beam at which the first station is currently working is the current working uplink receiving beam of the first access point, the first station performs data transmission with the first access point by using the first transmitting beam.

For example, the apparatus further includes: a negotiation module 43, configured to negotiate, with the second access point, working times and working sequences of respective uplink receiving beams of the first access point and the second access point, so that the current working uplink receiving beams corresponding respectively to the first access point and the second access point do not overlap in space.

For example, the determining module 41 is specifically configured to determine the current working uplink receiving beam of the first access point according to the working times and working sequences, obtained through negotiating by the negotiation module, of the uplink receiving beams of the first access point and a current system time.

For example, the determining module 41 is further configured to determine, according to location information of the first station, the first transmitting beam at which the first station works; and the sending module 42 is configured to send an identifier of the first transmitting beam determined by the determining module to the first station.

For example, the apparatus further includes: a receiving module 44, configured to receive a first sounding signal sent by the first station, where the determining module 41 is further configured to: according to the first sounding signal received by the receiving module, determine the first transmitting beam at which the first station works, and determine a first transmit beamforming matrix used by the first station; and the sending module 42 is further configured to send an identifier of the first transmitting beam and the first transmit beamforming matrix to the first station.

For example, the sending module 42 is specifically configured to: broadcast, in the current working uplink receiving beam of the first access point, the identifier of the current working uplink receiving beam of the first access point; or broadcast, in the uplink receiving beams of the first access point, the identifier of the current working uplink receiving beam of the first access point.

It should be noted that the functions of the determining module and the negotiation module may be implemented by using a processor, the function of the receiving module may be implemented by using a receiver, and the function of the sending module may be implemented by using a transmitter, where the receiving module and the sending module may be integrated in a transceiver.

In the present invention, a first access point determines a current working uplink receiving beam, where current working uplink receiving beams corresponding respectively to the first access point and a second access point do not overlap in space; and then the first access point broadcasts an identifier of the current working uplink receiving beam of the first access point, so that when a first station that is associated with the first access point determines that an identifier of a first transmitting beam at which the first station works is consistent with an identifier of the current working uplink receiving beam of the first access point, the first station performs data transmission in the first transmitting beam with the first access point. Because the current working uplink receiving beams corresponding respectively to the first access point and the second access point do not overlap in space, a first transmitting beam at which the first station that is associated with the first access point is currently working and a second transmitting beam at which a second station that is associated with the second access point is currently working do not overlap in space, thereby reducing interference during uplink coordinated transmission of multiple stations.

Figure 5:
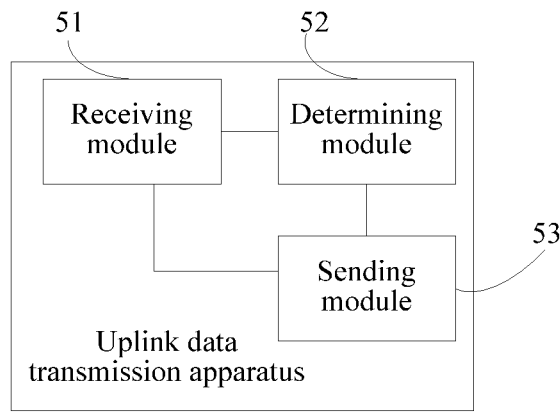
FIG. 5 is a schematic structural diagram of an uplink data transmission apparatus according to another embodiment of the present invention.

FIG. 5 is a schematic structural diagram of an uplink data transmission apparatus according to another embodiment of the present invention. As shown in FIG. 5, the apparatus is first station, and specifically includes: a receiving module 51, configured to receive an identifier, which is broadcast by a first access point, of a current working uplink receiving beam of the first access point, where the first station is associated with the first access point; a determining module 52, configured to determine, according to the identifier, which is received by the receiving module, of the current working uplink receiving beam of the first access point, that a first transmitting beam at which the first station is currently working is the current working uplink receiving beam of the first access point; and a sending module 53, configured to perform data transmission with the first access point by using the first transmitting beam. The current working uplink receiving beam of the first access point and a current working uplink receiving beam of a second access point do not overlap in space; a reception area of the first access point includes at least two reception subareas, and each reception subarea serves as one uplink receiving beam; and a signal coverage area of the first access point and a signal coverage area of the second access point have an overlapping part.

For example, the receiving module 51 is further configured to receive an identifier, which is sent by the first access point, of the first transmitting beam at which the first station works, where the first transmitting beam at which the first station works is determined by the first access point according to location information of the first station; and the first transmitting beam is one transmitting beam among uplink receiving beams of the first access point.

For example, the sending module 53 is specifically configured to: perform data transmission in the first transmitting beam with the first access point by using a first antenna.

For example, the sending module 53 is further configured to send a first sounding signal to the first access point, so that the first access point determines, according to the first sounding signal, the first transmitting beam at which the first station works, and determines a first transmit beamforming matrix used by the first station, and sends the identifier of first transmitting beam and the first transmit beamforming matrix to the first station.

For example, the receiving module 51 is further configured to receive an identifier, which is sent by the first access point, of the first transmitting beam and the first transmit beamforming matrix.

For example, the sending module 54 is specifically configured to: perform data transmission in the first transmitting beam with the first access point by using the first transmit beamforming matrix.

It should be noted that the function of the determining module may be implemented by using a processor, the function of the receiving module may be implemented by using a receiver, and the function of the sending module may be implemented by using a transmitter, where the receiving module and the sending module may be integrated in a transceiver.

In the present invention, a first access point determines a current working uplink receiving beam, where current working uplink receiving beams corresponding respectively to the first access point and a second access point do not overlap in space; and then the first access point broadcasts an identifier of the current working uplink receiving beam of the first access point, so that when a first station that is associated with the first access point determines that an identifier of a first transmitting beam at which the first station works is consistent with an identifier of the current working uplink receiving beam of the first access point, the first station performs data transmission in the first transmitting beam with the first access point. Because the current working uplink receiving beams corresponding respectively to the first access point and the second access point do not overlap in space, a first transmitting beam at which the first station that is associated with the first access point is currently working and a second transmitting beam at which a second station that is associated with the second access point is currently working do not overlap in space, thereby reducing interference during uplink coordinated transmission of multiple stations.

Figure 6:
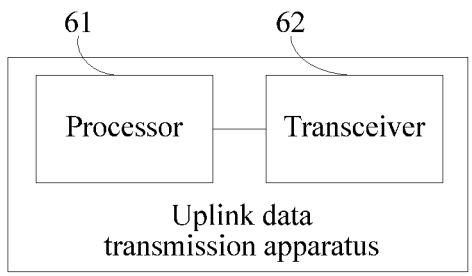
FIG. 6 is a schematic structural diagram of an uplink data transmission apparatus according to another embodiment of the present invention.

FIG. 6 is a schematic structural diagram of an uplink data transmission apparatus according to another embodiment of the present invention. As shown in FIG. 6, the apparatus is a first access point, and specifically includes: a processor 61, configured to determine a current working uplink receiving beam of the first access point, where the current working uplink receiving beam of the first access point and a current working uplink receiving beam of a second access point do not overlap in space; a reception area of the first access point includes at least two reception subareas, and each reception subarea serves as one uplink receiving beam; and a signal coverage area of the first access point and a signal coverage area of the second access point have an overlapping part; and a transceiver 62, configured to broadcast an identifier of the current working uplink receiving beam of the first access point, so that when a first station that is associated with the first access point determines, according to the identifier of the current working uplink receiving beam of the first access point, that a first transmitting beam at which the first station is currently working is the current working uplink receiving beam of the first access point, the first station performs data transmission with the first access point by using the first transmitting beam.

For example, the processor 61 is further configured to negotiate, with the second access point, working times and working sequences of respective uplink receiving beams of the first access point and the second access point, so that the current working uplink receiving beams corresponding respectively to the first access point and the second access point do not overlap in space.

For example, the processor 61 is specifically configured to determine the current working uplink receiving beam of the first access point according to the working times and working sequences of the uplink receiving beams of the first access point and a current system time.

For example, the processor 61 is further configured to determine, according to location information of the first station, the first transmitting beam at which the first station works; and the transceiver 62 is further configured to send an identifier of the first transmitting beam to the first station.

For example, the transceiver 62 is further configured to receive a first sounding signal sent by the first station. The processor 61 is further configured to: according to the first sounding signal, determine the first transmitting beam at which the first station works, and determine a first transmit beamforming matrix used by the first station. The transceiver 62 is further configured to send an identifier of the first transmitting beam and the first transmit beamforming matrix to the first station.

For example, the transceiver 62 is specifically configured to: broadcast, in the current working uplink receiving beam of the first access point, the identifier of the current working uplink receiving beam of the first access point; or broadcast, in the uplink receiving beams of the first access point, the identifier of the current working uplink receiving beam of the first access point.

Further, the apparatus further includes a memory and a communications bus, where the memory stores an instruction for implementing an uplink transmission method, and the processor is connected to the memory and the transceiver by using the communications bus.

In the present invention, a first access point determines a current working uplink receiving beam, where current working uplink receiving beams corresponding respectively to the first access point and a second access point do not overlap in space; and then the first access point broadcasts an identifier of the current working uplink receiving beam of the first access point, so that when a first station that is associated with the first access point determines that an identifier of a first transmitting beam at which the first station works is consistent with an identifier of the current working uplink receiving beam of the first access point, the first station performs data transmission in the first transmitting beam with the first access point. Because the current working uplink receiving beams corresponding respectively to the first access point and the second access point do not overlap in space, a first transmitting beam at which the first station that is associated with the first access point is currently working and a second transmitting beam at which a second station that is associated with the second access point is currently working do not overlap in space, thereby reducing interference during uplink coordinated transmission of multiple stations.

Figure 7:
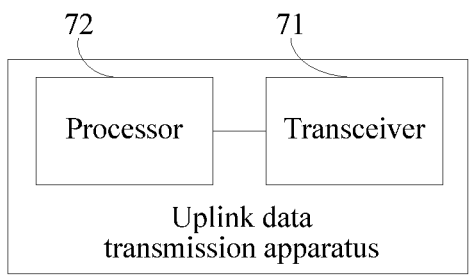
FIG. 7 is a schematic structural diagram of an uplink data transmission apparatus according to another embodiment of the present invention.

FIG. 7 is a schematic structural diagram of an uplink data transmission apparatus according to another embodiment of the present invention. As shown in FIG. 7, the apparatus is first station, and specifically includes: a transceiver 71, configured to receive an identifier, which is broadcast by a first access point, of a current working uplink receiving beam of the first access point, where the first station is associated with the first access point; a processor 72, configured to: when the processor 72 determines, according to the identifier of the current working uplink receiving beam of the first access point, that a first transmitting beam at which the first station is currently working is the current working uplink receiving beam of the first access point, perform data transmission in the first transmitting beam with the first access point by using the transceiver. The current working uplink receiving beam of the first access point and a current working uplink receiving beam of a second access point do not overlap in space; a reception area of the first access point includes at least two reception subareas, and each reception subarea serves as one uplink receiving beam; and a signal coverage area of the first access point and a signal coverage area of the second access point have an overlapping part.

For example, the transceiver 71 is further configured to receive an identifier, which is sent by the first access point, of the first transmitting beam at which the first station works, where the first transmitting beam at which the first station works is determined by the first access point according to location information of the first station; and the first transmitting beam is one transmitting beam among uplink receiving beams of the first access point.

For example, the transceiver 71 is specifically configured to: perform data transmission in the first transmitting beam with the first access point by using a first antenna.

For example, the transceiver 71 is further configured to send a first sounding signal to the first access point, so that the first access point determines, according to the first sounding signal, the first transmitting beam at which the first station works, determines a first transmit beamforming matrix used by the first station, and sends the identifier of first transmitting beam and the first transmit beamforming matrix to the first station.

For example, the transceiver 71 is specifically configured to: perform data transmission in the first transmitting beam with the first access point by using the first transmit beamforming matrix.

Further, the apparatus further includes a memory and a communications bus, where the memory stores an instruction for implementing an uplink transmission method, and the processor is connected to the memory and the transceiver by using the communications bus.

In the present invention, a first access point determines a current working uplink receiving beam, where current working uplink receiving beams corresponding respectively to the first access point and a second access point do not overlap in space; and then the first access point broadcasts an identifier of the current working uplink receiving beam of the first access point, so that when a first station that is associated with the first access point determines that an identifier of a first transmitting beam at which the first station works is consistent with an identifier of the current working uplink receiving beam of the first access point, the first station performs data transmission in the first transmitting beam with the first access point. Because the current working uplink receiving beams corresponding respectively to the first access point and the second access point do not overlap in space, a first transmitting beam at which the first station that is associated with the first access point is currently working and a second transmitting beam at which a second station that is associated with the second access point is currently working do not overlap in space, thereby reducing interference during uplink coordinated transmission of multiple stations.

Another embodiment of the present invention further provides an uplink coordinated data transmission apparatus. The apparatuses are located on a first access point and a second access point respectively, and for a schematic structural diagram of the apparatus of this embodiment, reference may be made to the uplink data transmission apparatus shown in FIG. 4. The uplink coordinated data transmission apparatuses specifically include: determining modules, configured to determine respectively, current working uplink receiving beams corresponding respectively to the first access point and the second access point, where the current working uplink receiving beams corresponding respectively to the first access point and the second access point do not overlap in space; and a signal coverage area of the first access point and a signal coverage area of the second access point have an overlapping part; and sending modules, configured to broadcast respectively identifiers of the current working uplink receiving beams corresponding respectively to the first access point and the second access point, so that when a first station and a second station determine respectively that identifiers of a first transmitting beam at which the first station is currently working and a second transmitting beam at which the second station is currently working are consistent with the identifiers, which are broadcast respectively by the first access point and the second access point, of the current working uplink receiving beams corresponding respectively to the first access point and the second access point, the first station and the second station perform respectively, in the first transmitting beam and the second transmitting beam at which the first station and the second station work respectively, data transmission with the first access point and the second access point that are associated respectively with the first station and the second station, where the first transmitting beam and the second transmitting beam do not overlap in space at a same moment.

A reception area of the first access point includes at least two reception subareas, a reception area of the second access point includes at least two reception subareas, and each reception subarea serves as one uplink receiving beam.

For example, the apparatuses further include negotiation modules, configured to negotiate between the first access point and the second access point, working times and working sequences of multiple uplink receiving beams obtained respectively through dividing by the first access point and the second access point, so that the current working uplink receiving beams corresponding respectively to the first access point and the second access point do not overlap in space.

For example, the determining modules are further configured to determine respectively, according to location information of the first station and the second station that are associated respectively with the first access point and the second access point, the first transmitting beam and the second transmitting beam at which the first station and the second station work respectively; and the sending modules are further configured to send respectively an identifier of the first transmitting beam and an identifier of the second transmitting beam to the first station and the second station that are associated respectively with the first access point and the second access point. The first transmitting beam and the second transmitting beam do not overlap in space at a same moment, the first transmitting beam is one transmitting beam among multiple uplink receiving beams that are obtained through dividing by the first access point, and the second transmitting beam is one transmitting beam among multiple uplink receiving beams that are obtained through dividing by the second access point.

For example, the apparatuses further include receiving modules, configured to receive respectively a first sounding signal and a second sounding signal that are sent by the first station and the second station that are associated respectively with the first access point and the second access point. The determining modules are further configured to determine respectively, according to the first sounding signal and the second sounding signal, the first transmitting beam and the second transmitting beam at which the first station and the second station work respectively, and determine respectively a first transmit beamforming matrix and a second transmit beamforming matrix that are used respectively by the first station and the second station. The sending modules are further configured to send respectively an identifier of the first transmitting beam and an identifier of the second transmitting beam, and the first transmit beamforming matrix and the second transmit beamforming matrix, to the first station and the second station that are associated respectively with the first access point and the second access point. The first transmitting beam and the second transmitting beam do not overlap in space at a same moment, the first transmitting beam is one transmitting beam among multiple uplink receiving beams that are obtained through dividing by the first access point, and the second transmitting beam is one transmitting beam among multiple uplink receiving beams that are obtained through dividing by the second access point.

For example, the determining modules are specifically configured to: determine respectively, according to the identifiers and corresponding working times and working sequences, determined respectively by the first access point and the second access point, of the multiple uplink receiving beams, and according to a current system time, the current working uplink receiving beams corresponding respectively to the first access point and the second access point.

For example, the sending modules are specifically configured to: broadcast respectively, in the current working uplink receiving beams corresponding respectively to the first access point and the second access point, the identifiers of the current working uplink receiving beams corresponding respectively to the first access point and the second access point; or broadcast, in the multiple uplink receiving beams obtained respectively through dividing by the first access point and the second access point, the identifiers of the current working uplink receiving beams corresponding respectively to the first access point and the second access point.

It should be noted that, in this embodiment, the functions of the determining module and the negotiation module may be implemented by using a processor, a function of the sending module may be implemented by using a transmitter, and the function of the receiving module may be implemented by using a receiver, where the sending module and the receiving module may be integrated in a transceiver.

In this embodiment of the present invention, a first access point and a second access point determine respectively current working uplink receiving beams corresponding respectively to the first access point and the second access point, where the current working uplink receiving beams corresponding respectively to the first access point and the second access point do not overlap in space; and then the first access point and the second access point broadcast respectively identifiers of the current working uplink receiving beams corresponding respectively to the first access point and the second access point, so that when a first station and a second station determine respectively that identifiers of a first transmitting beam and a second transmitting beam at which the first station and the second station work respectively are consistent with the identifiers, which are broadcast respectively by the first access point and the second access point, of the current working uplink receiving beams corresponding respectively to the first access point and the second access point, the first station and the second station send respectively, in the first transmitting beam and the second transmitting beam at which the first station and the second station work respectively, by using a same channel resource, data to the first access point and the second access point that are associated respectively with the first station and the second station, which improves spectral usage efficiency. Moreover, the current working transmitting beams of the stations do not overlap in space, which can reduce interference during uplink coordinated transmission of multiple stations.

Another embodiment of the present invention further provides an uplink coordinated data transmission apparatus. The apparatuses are located on a first station and a second station respectively, and for a schematic structural diagram of the uplink coordinated data transmission apparatus of this embodiment, reference may be made to the uplink data transmission apparatus shown in FIG. 5. The uplink coordinated data transmission apparatuses specifically include: receiving modules, configured to receive respectively identifiers, which are broadcast respectively by a first access point and a second access point, of current working uplink receiving beams corresponding respectively to the first access point and the second access point, where the first station is associated with the first access point, and the second station is associated with the second access point; and determining modules, configured to determine respectively that identifiers of a first transmitting beam at which the first station is currently working and a second transmitting beam at which the second station is currently working are consistent with the identifiers, which are broadcast respectively by the first access point and the second access point, of the current working uplink receiving beams corresponding respectively to the first access point and the second access point, sending modules, configured to: when it is determined respectively that the identifiers of the first transmitting beam at which the first station is currently working and the second transmitting beam at which the second station is currently working are consistent with the identifiers, which are broadcast respectively by the first access point and the second access point, of the current working uplink receiving beams corresponding respectively to the first access point and the second access point, perform respectively, in the first transmitting beam and the second transmitting beam at which the first station and the second station work respectively, data transmission with the first access point and the second access point that are associated respectively with the first station and the second station. The first transmitting beam and the second transmitting beam do not overlap in space at a same moment.

For example, the receiving modules are further configured to: before receiving respectively identifiers, which are broadcast respectively by a first access point and a second access point, of current working uplink receiving beams corresponding respectively to the first access point and the second access point, receive respectively identifiers, which are sent by the first access point and the second access point that are associated respectively with the first station and the second station, of the first transmitting beam and the second transmitting beam at which the first station and the second station work respectively. The identifiers of the first transmitting beam and the second transmitting beam at which the first station and the second station work respectively are determined by the first access point and the second access point according to location information of the first station and the second station that are associated respectively with the first access point and the second access point. The first transmitting beam is one transmitting beam among multiple uplink receiving beams that are obtained through dividing by the first access point, and the second transmitting beam is one transmitting beam among multiple uplink receiving beams that are obtained through dividing by the second access point.

For example, the sending modules are specifically configured to: perform respectively, in the first transmitting beam and the second transmitting beam at which the first station and the second station work respectively, by using a first antenna and a second antenna that are used respectively by the first station and the second station, data transmission with the first access point and the second access point that are associated respectively with the first station and the second station. The first antenna is an antenna used in the first transmitting beam by the first station, and the second antenna is an antenna used in the second transmitting beam by the second station, channel resources used by the first antenna and the second antenna are totally or partially the same in a time domain, and/or channel resources used by the first antenna and the second antenna are totally or partially the same in a frequency domain.

For example, the sending modules are further configured to: send respectively a first sounding signal and a second sounding signal to the first access point and the second access point that are associated respectively with the first station and the second station, so that the first access point and the second access point determine respectively, according to the first sounding signal and the second sounding signal, the first transmitting beam and the second transmitting beam at which the first station and the second station work respectively, determine respectively a first transmit beamforming matrix and a second transmit beamforming matrix that are used respectively by the first station and the second station, and send respectively an identifier of the first transmitting beam and an identifier of the second transmitting beam, and the first transmit beamforming matrix and the second transmit beamforming matrix to the first station and the second station that are associated respectively with the first access point and the second access point. The first transmitting beam is one transmitting beam among multiple uplink receiving beams that are obtained through dividing by the first access point, and the second transmitting beam is one transmitting beam among multiple uplink receiving beams that are obtained through dividing by the second access point.

For example, the sending modules are specifically configured to: perform respectively, in the first transmitting beam and the second transmitting beam at which the first station and the second station work respectively, by using the first transmit beamforming matrix and the second transmit beamforming matrix that are corresponding respectively to the first station and the second station, data transmission with the first access point and the second access point that are associated respectively with the first station and the second station. The first transmit beamforming matrix is a beamforming matrix used in the first transmitting beam by the first station, and the second transmit beamforming matrix is a beamforming matrix used in the second transmitting beam by the second station, channel resources used by the first transmit beamforming matrix and the second transmit beamforming matrix are totally or partially the same in a time domain, and/or channel resources used by the first transmit beamforming matrix and the second transmit beamforming matrix are totally or partially the same in a frequency domain.

It should be noted that, in this embodiment, the function of the determining module may be implemented by using a processor, the function of the sending module may be implemented by using a transmitter, and the function of the receiving module may be implemented by using a receiver, where the sending module and the receiving module may be integrated in a transceiver.

In this embodiment of the present invention, a first access point and a second access point determine respectively current working uplink receiving beams corresponding respectively to the first access point and the second access point, where the current working uplink receiving beams corresponding respectively to the first access point and the second access point do not overlap in space; and then the first access point and the second access point broadcast respectively identifiers of the current working uplink receiving beams corresponding respectively to the first access point and the second access point, so that when a first station and a second station determine respectively that identifiers of a first transmitting beam and a second transmitting beam at which the first station and the second station work respectively are consistent with the identifiers, which are broadcast respectively by the first access point and the second access point, of the current working uplink receiving beams corresponding respectively to the first access point and the second access point, the first station and the second station send respectively, in the first transmitting beam and the second transmitting beam at which the first station and the second station work respectively, by using a same channel resource, data to the first access point and the second access point that are associated respectively with the first station and the second station, which improves spectral usage efficiency. Moreover, the current working transmitting beams of the stations do not overlap in space, which can reduce interference during uplink coordinated transmission of multiple stations.

Figure 8:
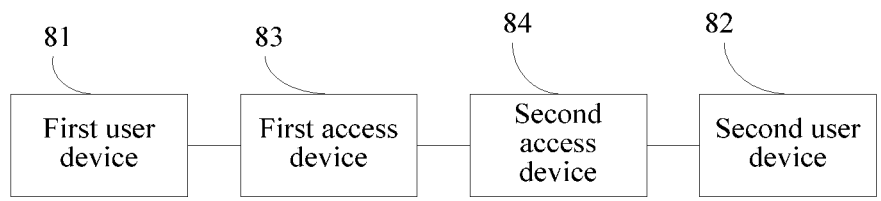
FIG. 8 is a schematic structural diagram of an uplink coordinated data transmission system according to another embodiment of the present invention.
Figure 9:
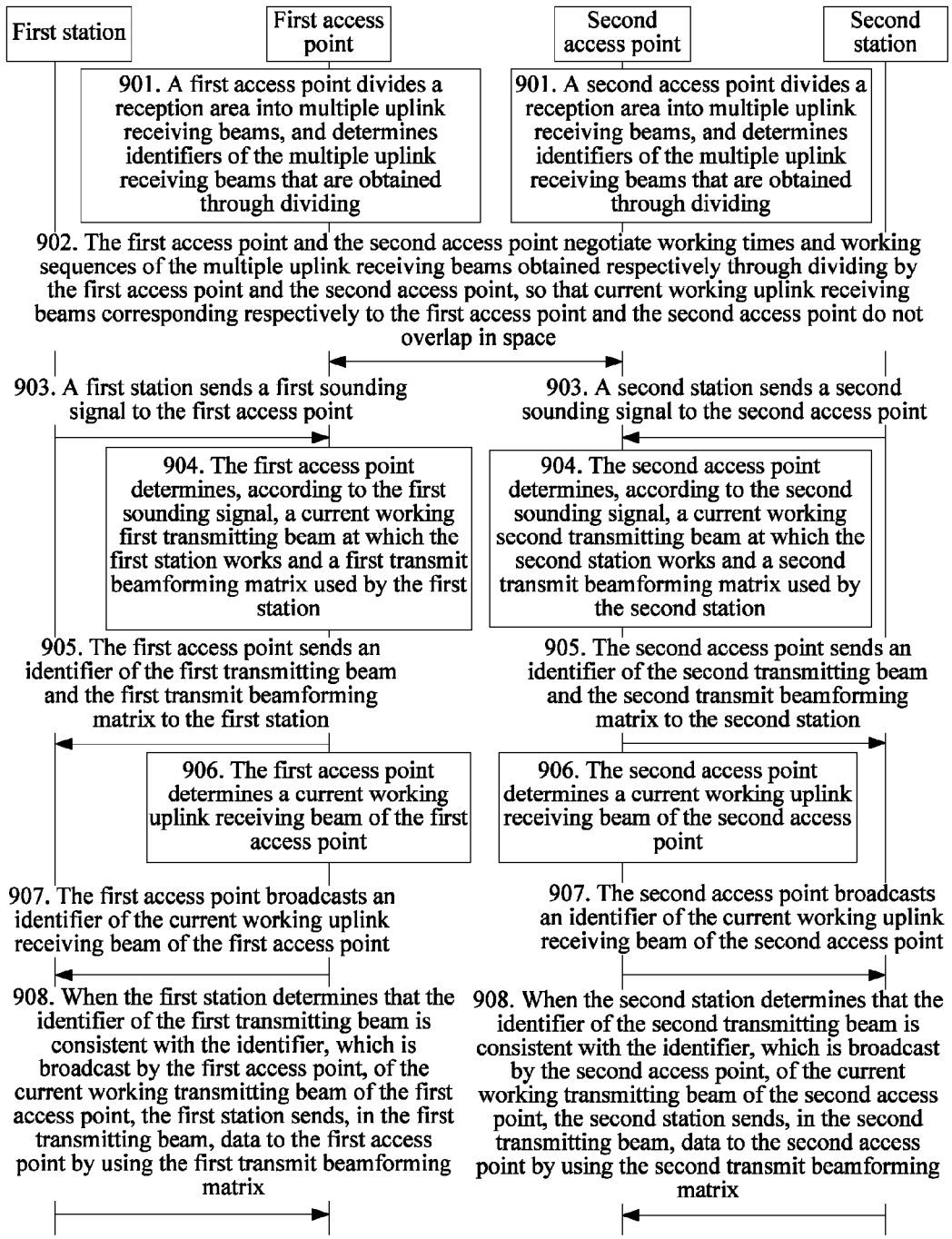
FIG. 9 is a working signaling diagram of the uplink coordinated data transmission system according to the embodiment shown in FIG. 8.

FIG. 8 is a schematic structural diagram of an uplink coordinated data transmission system according to another embodiment of the present invention. As shown in FIG. 8, the uplink coordinated data transmission system includes: a first station 81, a second station 82, a first access point 83, and a second access point 84, where the first station 81 is associated with the first access point 83, and the second station 82 is associated with the second access point 84. FIG. 9 is a working signaling diagram of the uplink coordinated data transmission system according to the embodiment shown in FIG. 8.

901: A first access point divides a reception area into multiple uplink receiving beams, and determines identifiers of the multiple uplink receiving beams that are obtained through dividing; a second access point divides a reception area into multiple uplink receiving beams, and determines identifiers of the multiple uplink receiving beams that are obtained through dividing.

902: The first access point and the second access point negotiate working times and working sequences of the multiple uplink receiving beams obtained respectively through dividing by the first access point and the second access point, so that current working uplink receiving beams corresponding respectively to the first access point and the second access point do not overlap in space.

903: A first station sends a first sounding signal to the first access point; second station sends a second sounding signal to the second access point.

904: The first access point determines, according to the first sounding signal, a first transmitting beam at which the first station is currently working and a first transmit beamforming matrix used by the first station; the second access point determines, according to the second sounding signal, a second transmitting beam at which the second station is currently working and a second transmit beamforming matrix used by the second station.

The first transmitting beam is one transmitting beam among the multiple uplink receiving beams that are obtained through dividing by the first access point, and the second transmitting beam is one transmitting beam among the multiple uplink receiving beams that are obtained through dividing by the second access point.

905: The first access point sends an identifier of the first transmitting beam and the first transmit beamforming matrix to the first station; the second access point sends an identifier of the second transmitting beam and the second transmit beamforming matrix to the second station.

906: The first access point determines a current working uplink receiving beam of the first access point; the second access point determines a current working uplink receiving beam of the second access point.

907: The first access point broadcasts an identifier of the current working uplink receiving beam of the first access point; the second access point broadcasts an identifier of the current working uplink receiving beam of the second access point.

908: When the first station determines that the identifier of the first transmitting beam is consistent with the identifier, which is broadcast by the first access point, of the current working transmitting beam of the first access point, the first station sends, in the first transmitting beam, data to the first access point by using the first transmit beamforming matrix; when the second station determines that the identifier of the second transmitting beam is consistent with the identifier, which is broadcast by the second access point, of the current working transmitting beam of the second access point, the second station sends, in the second transmitting beam, data to the second access point by using the second transmit beamforming matrix.

In this embodiment of the present invention, a first access point and a second access point determine respectively current working uplink receiving beams corresponding respectively to the first access point and the second access point, where the current working uplink receiving beams corresponding respectively to the first access point and the second access point do not overlap in space; and then the first access point and the second access point broadcast respectively identifiers of the current working uplink receiving beams corresponding respectively to the first access point and the second access point, so that when a first station and a second station determine respectively that identifiers of a first transmitting beam and a second transmitting beam at which the first station and the second station work respectively are consistent with the identifiers, which are broadcast respectively by the first access point and the second access point, of the current working uplink receiving beams corresponding respectively to the first access point and the second access point, the first station and the second station send respectively, in the first transmitting beam and the second transmitting beam at which the first station and the second station work respectively, by using a same channel resource, data to the first access point and the second access point that are associated respectively with the first station and the second station, which improves spectral usage efficiency. Moreover, the current working transmitting beams of the stations do not overlap in space, which can reduce interference during uplink coordinated transmission of multiple stations.

Figure 10:
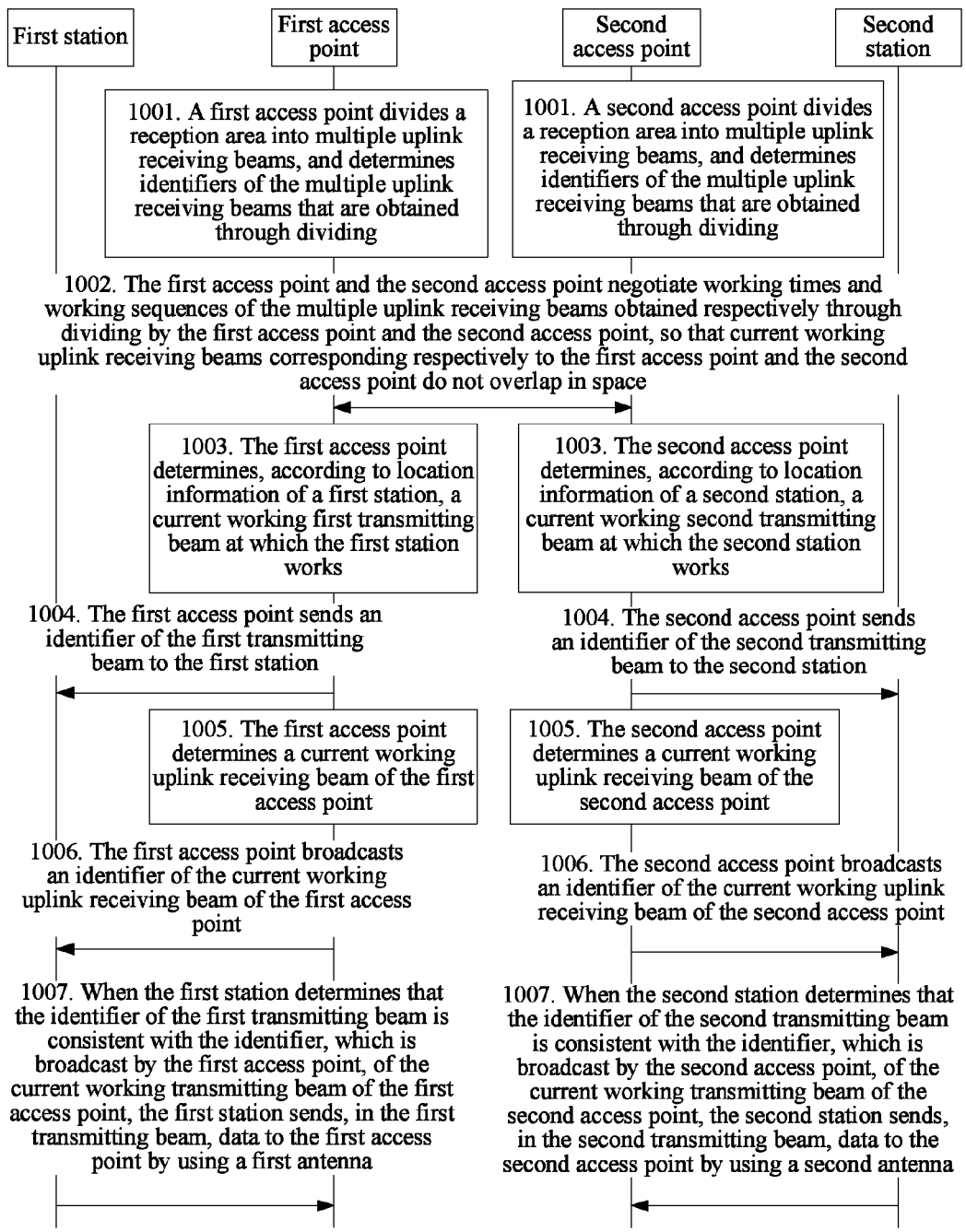
FIG. 10 is another working signaling diagram of the uplink coordinated data transmission system according to the embodiment shown in FIG. 8.

FIG. 10 is another working signaling diagram of the uplink coordinated data transmission system according to the embodiment shown in FIG. 8.

1001: A first access point divides a reception area into multiple uplink receiving beams, and determines identifiers of the multiple uplink receiving beams that are obtained through dividing; a second access point divides a reception area into multiple uplink receiving beams, and determines identifiers of the multiple uplink receiving beams that are obtained through dividing.

1002: The first access point and the second access point negotiate working times and working sequences of the multiple uplink receiving beams obtained respectively through dividing by the first access point and the second access point, so that current working uplink receiving beams corresponding respectively to the first access point and the second access point do not overlap in space.

1003: The first access point determines, according to location information of the first station, a first transmitting beam at which the first station is currently working; the second access point determines, according to location information of the second station, a second transmitting beam at which the second station is currently working.

When being associated with the first access point, the first station may send the location information of the first station to the first access point; and when being associated with the second access point, the second station may send the location information of the second station to the second access point.

The first transmitting beam is one transmitting beam among the multiple uplink receiving beams that are obtained through dividing by the first access point, and the second transmitting beam is one transmitting beam among the multiple uplink receiving beams that are obtained through dividing by the second access point.

1004: The first access point sends an identifier of the first transmitting beam to the first station; the second access point sends an identifier of the second transmitting beam to the second station.

1005: The first access point determines a current working uplink receiving beam of the first access point; the second access point determines a current working uplink receiving beam of the second access point.

1006: The first access point broadcasts an identifier of the current working uplink receiving beam of the first access point; the second access point broadcasts an identifier of the current working uplink receiving beam of the second access point.

1007: When the first station determines that the identifier of the first transmitting beam is consistent with the identifier, which is broadcast by the first access point, of the current working transmitting beam of the first access point, the first station sends, in the first transmitting beam, data to the first access point by using a first antenna; when the second station determines that the identifier of the second transmitting beam is consistent with the identifier, which is broadcast by the second access point, of the current working transmitting beam of the second access point, the second station sends, in the second transmitting beam, data to the second access point by using a second antenna.

In this embodiment of the present invention, a first access point and a second access point determine respectively current working uplink receiving beams corresponding respectively to the first access point and the second access point, where the current working uplink receiving beams corresponding respectively to the first access point and the second access point do not overlap in space; and then the first access point and the second access point broadcast respectively identifiers of the current working uplink receiving beams corresponding respectively to the first access point and the second access point, so that when a first station and a second station determine respectively that identifiers of a first transmitting beam and a second transmitting beam at which the first station and the second station work respectively are consistent with the identifiers, which are broadcast respectively by the first access point and the second access point, of the current working uplink receiving beams corresponding respectively to the first access point and the second access point, the first station and the second station send respectively, in the first transmitting beam and the second transmitting beam at which the first station and the second station work respectively, by using a same channel resource, data to the first access point and the second access point that are associated respectively with the first station and the second station, which improves spectral usage efficiency. Moreover, the current working transmitting beams of the stations do not overlap in space, which can reduce interference during uplink coordinated transmission of multiple stations.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, the functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a removable hard disk, a read-only memory (ROM for short), a random access memory (RAM for short), a magnetic disk, or an optical disc.

Finally, it should be noted that the foregoing embodiments are merely intended to describe the technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the protection scope of the technical solutions of the embodiments of the present invention.

What is claimed is:

1. A data transmission method, comprising:
negotiating, by a first access point with a second access point, working times and working sequences of respective uplink receiving beams of the first access point and the second access point, so that the uplink receiving beams corresponding respectively to the first access point and the second access point do not overlap in space, and wherein a reception area of the first access point comprises at least two reception subareas, and each reception subarea serves as one uplink receiving beam, and wherein a signal coverage area of the first access point and a signal coverage area of the second access point have an overlapping part;
receiving, by the first access point, a first sounding signal sent by a first station;
determining, by the first access point, according to the first sounding signal, a first transmitting beam at which the first station works;
determining a first transmit beamforming matrix used by the first station;
sending, by the first access point, an identifier of the first transmitting beam and the first transmit beamforming matrix to the first station; and
broadcasting, by the first access point, an identifier of the uplink receiving beam of the first access point, so that when the first station determines, according to the identifier of the uplink receiving beam of the first access point, that the first transmitting beam at which the first station is currently working is the uplink receiving beam of the first access point, the first station performs data transmission with the first access point using the first transmitting beam.

2. The method according to claim 1, wherein the determining comprises determining, by the first access point, the uplink receiving beam of the first access point according to the working times and working sequences of the uplink receiving beams of the first access point and a current system time.

3. The method according to claim 1, wherein the broadcasting comprises broadcasting, by the first access point, in the uplink receiving beam of the first access point, the identifier of the uplink receiving beam of the first access point; or wherein the broadcasting comprises broadcasting, in the uplink receiving beams of the first access point, the identifier of the uplink receiving beam of the first access point.

4. A data transmission method, comprising:
sending, by a first station, a first sounding signal to a first access point;
receiving, by the first station, an identifier of a first transmitting beam and a first transmit beamforming matrix that are sent by the first access point, wherein the first transmitting beam is the first transmitting beam at which the first station works, and the first transmit beamforming matrix is a first transmit beamforming matrix used by the first station, the first transmitting beam and the first transmit beamforming matrix being determined by the first access point according to the first sounding signal;
receiving, by the first station, an identifier of an uplink receiving beam of a first access point, the identifier being broadcast by the first access point, wherein the first station is associated with the first access point; and
performing, by the first station, data transmission with the first access point using the first transmitting beam when the first station determines, according to the identifier of the uplink receiving beam of the first access point, that the first transmitting beam at which the first station is currently working is the uplink receiving beam of the first access point;
wherein the uplink receiving beam of the first access point and an uplink receiving beam of a second access point do not overlap in space;
wherein a reception area of the first access point comprises at least two reception subareas, and each reception subarea serves as one uplink receiving beam; and
wherein a signal coverage area of the first access point and a signal coverage area of the second access point have an overlapping part.

5. The method according to claim 4, wherein the performing comprises performing, by the first station, data transmission in the first transmitting beam with the first access point using a first antenna.

6. A data transmission apparatus, wherein the apparatus is a first access point and comprises:
a processor; and
a non-transitory computer-readable storage medium storing a program to be executed by the processor, the program including instructions to:
negotiate, with a second access point, working times and working sequences of respective uplink receiving beams of the first access point and the second access point, so that the uplink receiving beams corresponding respectively to the first access point and the second access point do not overlap in space;
receive a first sounding signal sent by a first station;
determine a first transmitting beam at which the first station works according to the first sounding signal;
determine a first transmit beamforming matrix used by the first station;
send an identifier of the first transmitting beam and the first transmit beamforming matrix to the first station; and
broadcast an identifier of the uplink receiving beam of the first access point, so that when the first station determines, according to the identifier of the uplink receiving beam of the first access point, that the first transmitting beam at which the first station is currently working is the uplink receiving beam of the first access point, the first station performs data transmission with the first access point using the first transmitting beam.

7. The apparatus according to claim 6, wherein the program includes further instructions to broadcast, in the uplink receiving beam of the first access point, the identifier of the uplink receiving beam of the first access point; or to broadcast, in the uplink receiving beams of the first access point, the identifier of the uplink receiving beam of the first access point.

8. A data transmission apparatus, the apparatus being first station, wherein the apparatus comprises:
a processor; and
a non-transitory computer-readable storage medium storing a program to be executed by the processor, the program including instructions to:
send a first sounding signal to a first access point;
receive an identifier of a first transmitting beam and a first transmit beamforming matrix that are sent by the first access point, wherein the first transmitting beam is the first transmitting beam at which the first station works, and the first transmit beamforming matrix is a first transmit beamforming matrix used by the first station, the first transmitting beam and the first transmit beamforming matrix being determined by the first access point according to the first sounding signal;
receive an identifier, which is broadcast by a first access point, of an uplink receiving beam of the first access point, wherein the first station is associated with the first access point;
determine, according to the identifier of the uplink receiving beam of the first access point, that a first transmitting beam at which the first station is currently working is the uplink receiving beam of the first access point; and
perform data transmission with the first access point by using the first transmitting beam;
wherein the uplink receiving beam of the first access point and an uplink receiving beam of a second access point do not overlap in space;
wherein a reception area of the first access point comprises at least two reception subareas, and each reception subarea serves as one uplink receiving beam; and
wherein a signal coverage area of the first access point and a signal coverage area of the second access point have an overlapping part.

* * * * *